United States Patent [19]

Hall et al.

[11] Patent Number: 5,230,204
[45] Date of Patent: Jul. 27, 1993

[54] HEAT SEALED CARTON

[75] Inventors: James Hall, Whitley Bay; John E. Wilson, Steeton, NR. Keighley, both of United Kingdom

[73] Assignee: Bowater PKL Limited, United Kingdom

[21] Appl. No.: 815,402

[22] Filed: Dec. 31, 1991

[30] Foreign Application Priority Data

Oct. 11, 1991 [GB] United Kingdom ............... 9121579.8

[51] Int. Cl.$^5$ .................................................. B65B 51/20
[52] U.S. Cl. .................................... 53/477; 53/370.9; 493/134
[58] Field of Search .................... 53/477, 370.9, 370.8; 493/165, 134

[56] References Cited

U.S. PATENT DOCUMENTS

| | | | |
|---|---|---|---|
| 3,309,841 | 3/1967 | Egleston et al. | 53/370.9 |
| 3,314,216 | 4/1967 | Fitzwater | 53/370.9 X |
| 3,405,505 | 10/1968 | Mistarz | 53/370.9 X |
| 3,724,093 | 4/1973 | Olila | 53/370.9 X |
| 3,825,408 | 7/1974 | Farfaglia et al. | 53/370.9 X |
| 4,838,009 | 6/1989 | Connor et al. | 53/370.9 X |

FOREIGN PATENT DOCUMENTS 9009926 9/1990 World Int. Prop. O. .

Primary Examiner—James F. Coan
Attorney, Agent, or Firm—Cumpston & Shaw

[57] ABSTRACT

A gable-top carton has a pair of panels (4, 6) which form sloping walls and have marginal portions (4m, 6m). Another pair of panels (3m, 5m), are tucked beneath the sloping walls and have marginal portions (3m, 5m). The marginal portions (3m-6m) are heat sealed together to form a ridge-shaped seal. One panel (5) is the pouring spout panel and this is revealed when wings (9, 10), on the sealed carton are folded back. The pouring spout panel (5) is secured by a bond (34) made in a central folded corner (26), a bond (35, 36) between outer corners of the wings (9, 10), and a bond between confronting surfaces of the marginal portions 4m, 6 m). Areas on the marginal portions (4m, 6 m) are not directly heated to facilitate opening of the pouring spout whilst providing an hermetic seal.

9 Claims, 10 Drawing Sheets

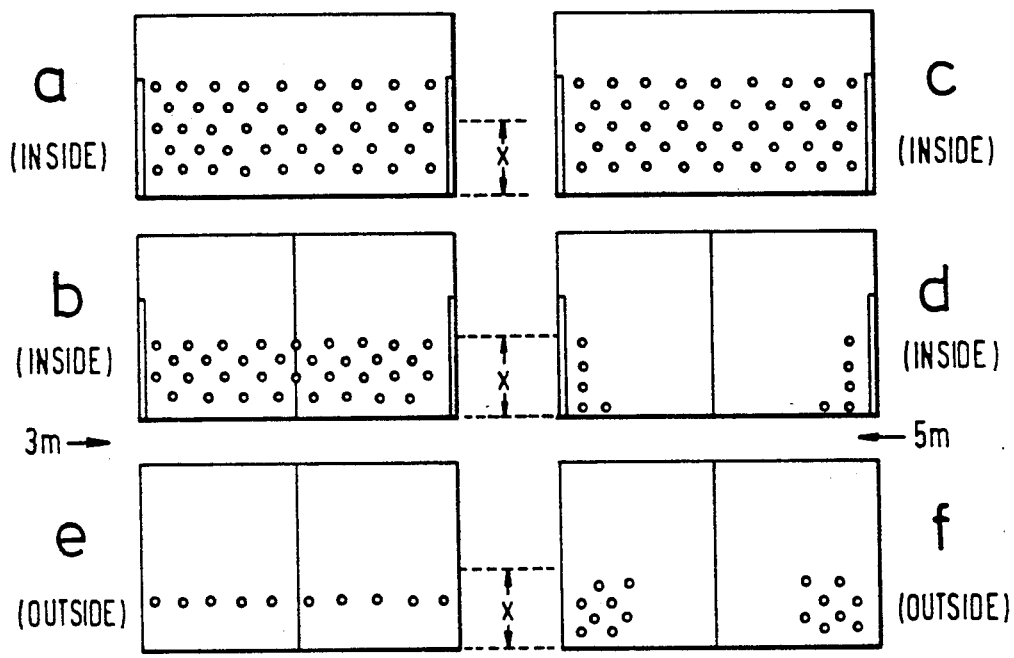
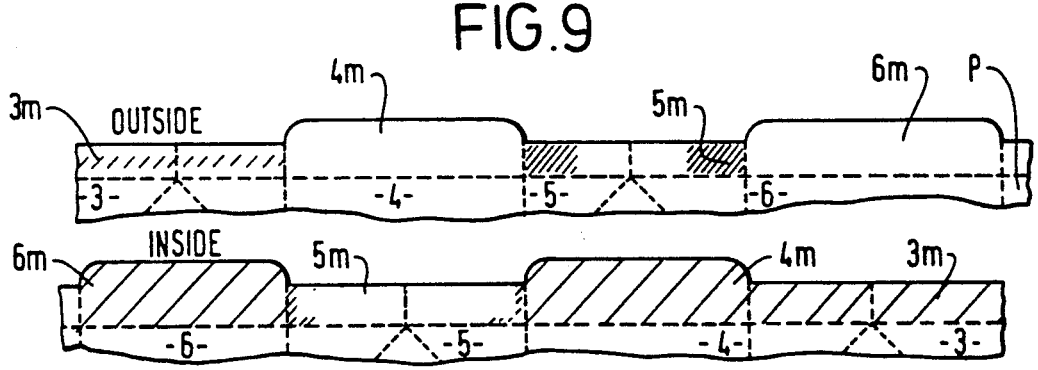

(KNOWN HIGH SPEED OVEN MODIFIED TO PREVENT LEAKAGE)

HEAT SEALED CARTON

This invention relates to a heat sealed carton having a pouring spout panel which is revealed by folding back triangular wings, the wings then being drawn forwardly to form a pouring spout. The invention also relates to a method and apparatus for heat sealing the carton in such a manner as to facilitate opening of the pouring spout.

BACKGROUND OF INVENTION

Cartons having so-called "gable-tops", "slant-tops", or "fold-flat-tops" are widely used as disposable containers for liquid products, such as milk. These cartons are generally made from paperboard which is coated, on both sides, with a plastics material (such as polyethylene). This material forms protective layers which also serve as a heat activated adhesive. In making the carton, a coated paperboard carton blank is formed into a sleeve having a square or rectangular cross-section. One pair of opposite panels at the top of the sleeve are subsequently formed into the sloping or outer walls of e.g. the gable top. (These sloping walls are similarly present in, e.g. a "fold flat-top carton" during the initial stages of making the carton, since the top is subsequently folded flat.) The other pair of opposite walls are folded inwardly, in bellows fashion, and are tucked under the sloping walls before the marginal portions of the panels are heat sealed together so as to form a ridge-shaped seal at the top of the carton. (The ridge-shaped seal is formed on the slant in a "fold flat-top" carton so the top can be subsequently folded flat.) One of the panels which is tucked under the sloping or outer walls will be referred to as the pouring spout panel and this panel is revealed when the triangular wings are folded back to enable this panel to be drawn forwardly to form the pouring spout.

Such cartons are normally transported from a filling station (where each carton is filled with liquid) to a heating station (where the marginal portions of the panels are heated to activate the adhesive) and then to a sealing station (where the marginal portions are pressed together to form the ridge-shaped seal). The heating station usually includes an "oven" for heating the marginal portions of the carton top by streams of hot air and the sealing station usually includes parallel jaws for pressing the heated marginal portions together in order to form the ridge-shaped seal.

As these cartons are of a comparatively simple and inexpensive construction, i.e. for use as disposable containers, problems are encountered in forming hermetic seals and also in making sealed cartons which are easy to open. Whilst various attempts have been made to form easy-to-open hermetic seals there is a conflict between making a reliable hermetic seal and weakening the seal to facilitate opening.

A conventional technique for making cartons easier to open employs an "abhesive" coating on certain zones of the marginal portions of the carton. The abhesive coating reduces adhesion and thereby enables the pouring panel to be easily released when the carton is opened. However, the use of abhesive has certain disadvantages. Besides the cost of the abhesive, there is the cost involved in modifying carton manufacturing machines to coat abhesive onto selected zones of the marginal portions of the carton, and the cost of maintaining such a machine under working conditions. Also, for reasons which will be explained below, abhesive coatings can be rendered ineffective by overheating and/or by splashing when operating at high filling speeds.

An attempt to solve the problem of making an easy-to-open hermetic seal is disclosed in WO-A-90/09926. One of the essential characteristic features of this prior art solution is to leave an area (which may be in the shape of an inverted triangle, or a notch, or sector) unsealed, or lightly sealed at the top centre of an "end flap" which forms part of the pouring spout. This "unsealed" area is intended to assist in facilitating the step of drawing the pouring panel forwards, after folding back the triangular wings, since an area at the top central position is left unsealed. This solution also mentions the use of a stake point located at the apex of the triangle to provide an effective seal. Use can also be made of an abhesive at the unsealed area to prevent adhesion. This solution apparently employs a particular post-pasteurisation process in combination with the weakened seal.

Despite such prior art attempts to solve the problem of an easy-to-open hermetic seal, various problems can generally arise in making effective ridge-shaped hermetic seals when operating at higher filling speeds. Filling speeds are limited by certain physical requirements but the number of cartons which can be filled per minute depends, to some extent, on the volumetric capacity of the cartons. For example, a relatively slow speed is used to fill larger cartons having, e.g. capacities of two pints and one liter. However, a relatively faster speed cam be used to fill smaller cartons with capacities of, e.g. ⅓, ½ and 1 pint, and ¼ liter. For obvious economic reasons, filling plants wish to fill cartons as fast as possible. However, if the filling speed is too high, the liquid expelled from filling spouts can splash onto regions of the carton which are coated with the plastics material that is activated (by heat) to form the adhesive bond in the ridge-shaped seal. It can similarly splash onto zones of the carton which may be coated with abhesive. In addition to this, each carton will spend less time at the heat sealing station, due to the higher throughput, and then more heat needs to be applied to activate the heat sensitive plastics coating in a shorter space of time. If the amount of heat is not increased in an attempt to create an easy-to-open seal, the bond between the marginal portions may not be strong enough (in certain areas) and this can lead to leakage when the sealed cartons are subsequently handled and transported to consumer outlets. If more heat is applied, e.g. by increasing the size of the zones heated by air streams, this will increase the strength of the seal in places where a weaker bond is required to facilitate opening of the carton. In this case, although an hermetic seal can be made, the cartons are difficult to open. If more heat is applied by increasing the temperature and/or volume of flow of the air streams the plastics coating can then be overheated to an extent which adversely affects the ridge-shaped seal. Moreover, where abhesive coatings are used, the abhesive can be rendered ineffective by such overheating. Also, whether or not abhesives are used, streaks of adhesive can run over zones which are intended to be left unsealed, or caused to be lightly sealed, and this subsequently increases the strength of the seal in places where a weaker bond is required to facilitate opening.

Problems can also be caused by stretching of chains which are in used in the transporting systems that convey cartons between the filling station and the heating and sealing stations. If the chains stretch, each carton can be misaligned with respect to the "oven" in the heating station and the heated air streams will be misdirected towards zones on the marginal portions of the panels which form the ridge-shaped seal. Similar misalignment can occur at the sealing station and the heated marginal portions will not then be pressed together properly, between jaws, to form the ridge-shaped seal.

A particular difficulty is experienced in sealing a central region of the ridge-shaped seal, i.e. where the bellows-shaped panels meet, but leave a small gap, between confronting V-shaped folds. Liquid can escape through this gap, particularly where efforts are made to weaken the ridge-shaped seal so as to facilitate release of the pouring spout.

Carton leakage may not be present or easily detectable when the cartons are filled and sealed and leakage is far more likely to occur when the cartons are packed and transported to consumer outlets. For example, the cartons may be packed in tens or twelves in shrink-wrappings which are stacked five cartons high. In view of the internal pressures caused by stacking and handling, a carton may start to leak and this will be visibly detected by liquid gathering in the bottom of the shrink wrapper. The whole pack of cartons in such a wrapper will be subsequently rejected by the retail outlet or end user.

As the prevention of leakage is far more important than solving the problem of making the carton easy to open, the tendency is to reduce the risk of leakage by using more heat over larger zones of the marginal portions of the carton so as to ensure that a good hermetic seal is made. However, as this is at the expense of facilitating opening of the carton, cartons sealed in this way are undesirable end products to the consumer.

OBJECTS OF INVENTION

An object of the invention is to provide a method and apparatus for heat sealing cartons so as to provide an effective hermetic seal whilst enabling the carton to be easily opened. In achieving this object, the present invention adopts a different approach to those mentioned above with regard to the manner in which marginal portions of the carton blank are heated prior to the step of applying pressure to form the ridge-shaped seal.

A further object of the invention is to provide a method for heat sealing cartons which is less critical with regard to temperature and transport speed compared with the prior art.

SUMMARY OF INVENTION

The invention relates to a method of heat sealing the top of a carton which is of a kind made from a blank which can be formed into a sleeve having panels for respectively forming a closed carton bottom and an open carton top. The carton top includes first and second opposite panels which terminate in respective first and second marginal portions, third and fourth opposite panels which terminate in respective second and third marginal portions, the third panel forming a pouring spout panel, the first and second marginal portions extending upwardly beyond upper edges of the third and fourth marginal portions, and at least said marginal portions being coated with a material which serves as a heat-activated adhesive. Generally, the method includes the steps of:

heating zones on the marginal portions to activate the adhesive;

folding the panels so that the first and second panels form outer walls and so that the third and fourth panels are folded inwardly, in bellows fashion, and tucked under the outer walls, and urging the heated marginal portions together to form a ridge-shaped seal in which parts of the first and second marginal portions are bonded together above the upper edges of the third and fourth marginal portions, the sealed carton being such that the pouring spout panel, can be revealed by folding back wing portions which can then be drawn forwardly to form a pouring spout.

The invention provides the improvement wherein only end zones and a central zone of the outside surface of the marginal portion of the third panel are directly heated, the end zones being spaced from the central zone by areas which are not directly heated. This step is carried out in combination with the direct heating of zones on the inside surfaces of the marginal portions of the first and second panels, except for an area, on each such marginal portion, which is intended to face a respective part of the inside surface of the marginal portion of the third panel. With this form of heating when the heated marginal portions are urged together to form said ridge-shaped seal, the third panel is secured by (i) a bond at a centrally folded corner of its marginal portion, (ii) a bond between opposite outer corners of said wings, and (iii) a bond across the parts of the first and second marginal portions which extend above upper edges of the third and fourth marginal portions in the ridge-shaped seal.

A particular advantage of the invention is that the method can be used to form a hermetic seal but the pouring spout can be easily pulled out by the end user.

Preferably, a vertical dam is formed, in the ridge-shaped seal, adjacent the bonded outer corners of the wings to improve the seal. It is also preferred to form a horizontal dam, in the ridge-shaped seal, which bridges confronting V-folds of the third and fourth panels in the carton. This improves the seal in the central region of the ridge. Another advantage in making such a horizontal dam is that it nips together the bond formed at the centrally folded corner of the folded marginal portion of the third panel thereby assisting in making this bond. Double parallel dams are also preferably formed, in the ridge-shaped seal, across the first, second and folded fourth marginal portions.

The invention also provides a heating head for use in the method of the invention and a carton sealed in accordance with the method of the invention.

DESCRIPTION OF DRAWINGS

Various other advantages of the invention will become apparent from the following description of a preferred embodiment of the invention which is described in connection with a gable top carton, by way of example only, and with reference to some of the accompanying Drawings. In the Drawings:

FIG. 9 illustrates outside and inside surfaces of marginal portions of the carton blank, FIG. 10(a–f) show side elevations of wall portions of an oven used with low filling speed, FIG. 20 is a perspective view of the jaws shown in FIG. 20.

DESCRIPTION OF EXEMPLARY EMBODIMENT

With reference to FIGS. 1–4, a description will first be given of a conventional gable-top carton. Although the construction of this carton is known, the description will serve to identify various parts of the carton in the subsequent description of the preferred embodiment of the invention.

Figure 1:
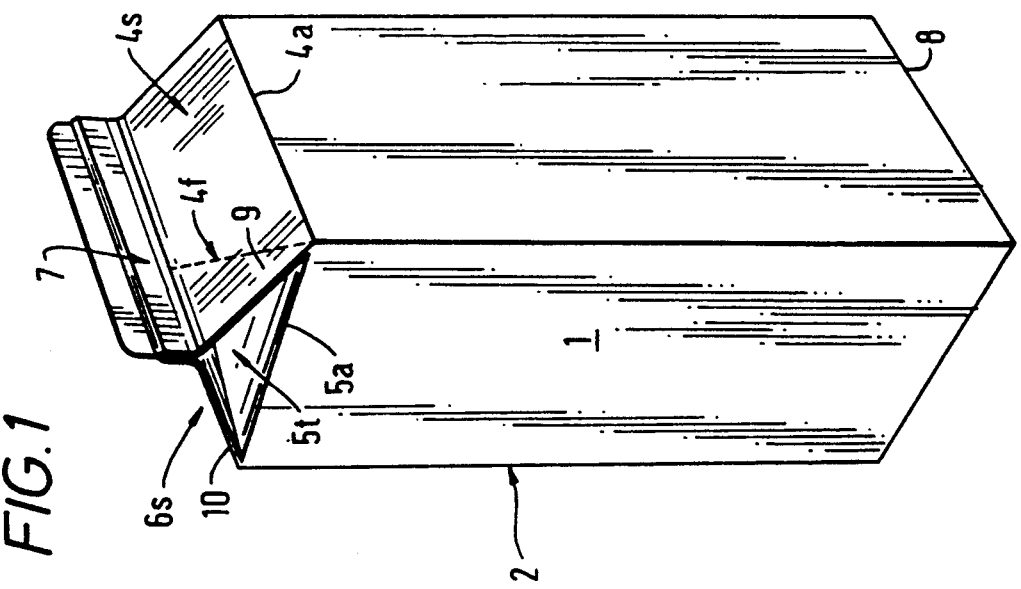
FIG. 1 is a perspective view of a gable-topped carton of conventional construction.
Figure 4:
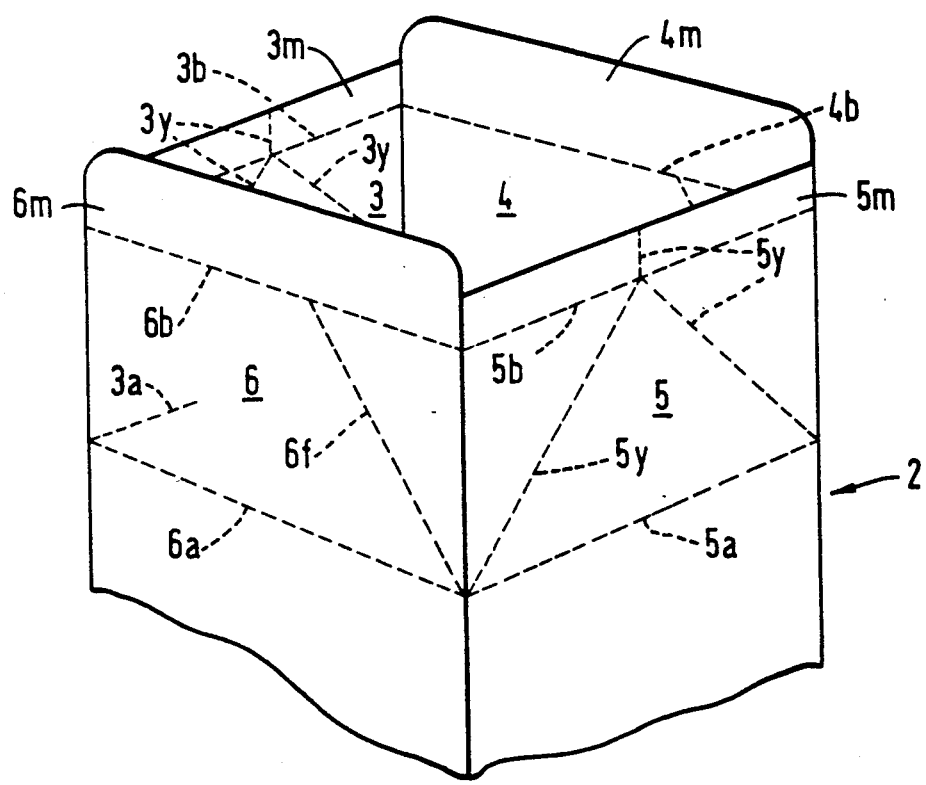
FIG. 4 shows the carton, of FIG. 1 in a fully opened position (before heating and sealing)

FIG. 1 shows the gable-top carton 1 in its filled condition. The carton is made from a flat blank of paperboard which is coated, on both sides, with a thermoplastic film, e.g. polyethylene. The carton is folded into a sleeve 2 of rectangular or square cross section. FIG. 4 shows an upper part of the sleeve 2 which has end panels 3–6. The end panels have respective marginal portions 3 m–6m which form a ridge-shaped seal 7 (FIG. 1) in the finished carton. The marginal portions 4m 6m extend above the upper edges of the folded marginal portions 3m, 5m in the seal 7 so as to provide an upper bond. The opposite pair of panels 4 and 6 form sloping wall portions 4s, 6s (FIG. 1) in the sealed carton. The other opposite pair of panels 3 and 5 each have inverted Y shaped creases 3y, 5y (FIG. 4), which enable panels 3 and 5 to fold inwardly, in a bellows fashion, so that they can be tucked under the sloping or outer wall portions 4f, 6f in the sealed carton. In FIG. 1, only a triangular portion 5t of panel 5 can be seen.

FIG. 4 also shows horizontal creases 3a–6a and 3b–6b which circumscribe the sleeve 2. Creases 3b, 5b intersect the junction of the respective inverted Y creases 3y, 5y.

Figure 2:
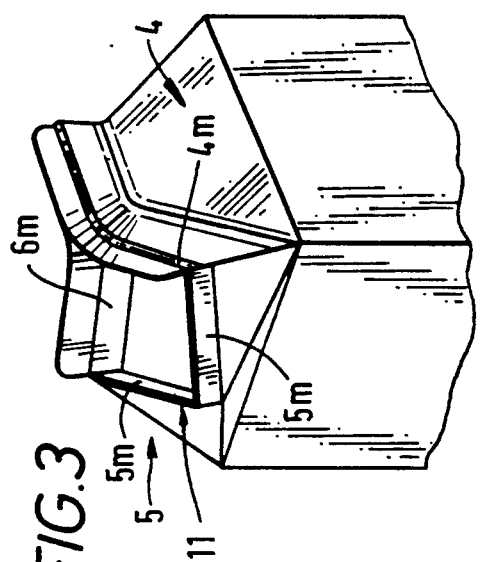
FIGS. 2 and 3 show opening stages of the top of the carton shown in FIG. 1.
Figure 3:
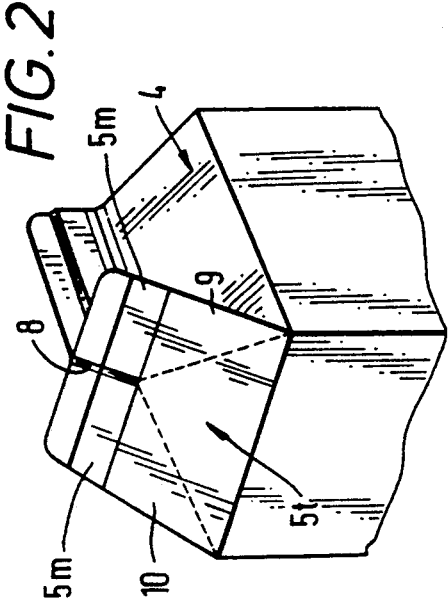

Referring to FIGS. 2 and 3, panel 5, which may be called the pouring spout panel, is revealed when triangular wings 9, 10 are folded back to straighten the folded marginal portion 5 m on each side of a centre fold 8. This action is to disrupt the bond between the marginal portions which initially secure the wings together (in the ridge-shaped seal 7) so that the wings can then be drawn forwardly to break the bonds between marginal portions 4m, 5m on one side and 6m, 5m on the other side and thereby form a pouring spout 11. Creases 4f, 6f in panels 4 and 6 are made to facilitate folding back the wings 10, 11 to the positions shown in FIG. 2.

Figure 5:
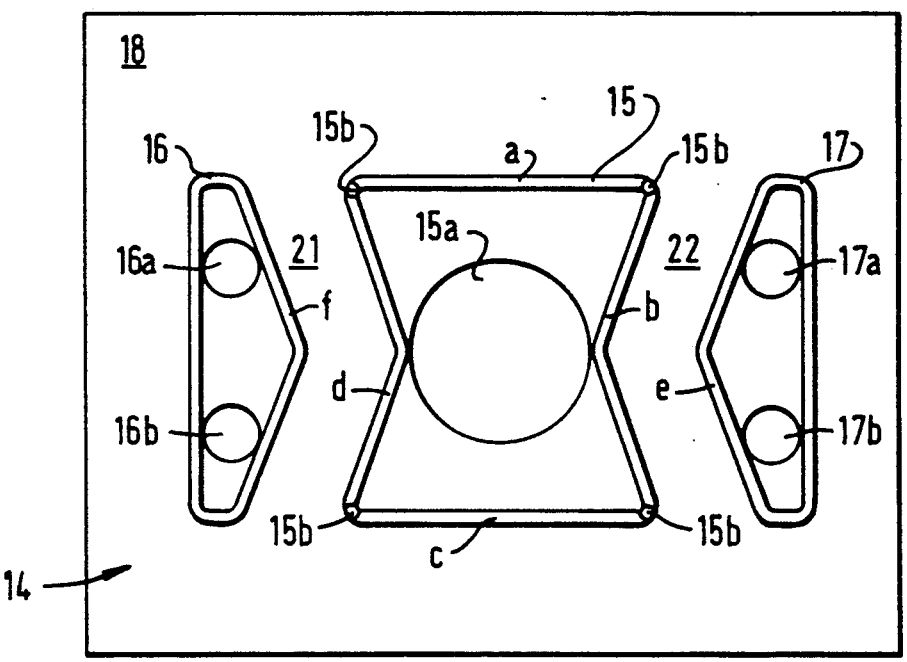
FIG. 5 is an underside view, partly in section, of a conventional heating head, FIG. 6(a–f) show side elevations of respective wall portions of the oven shown in FIG. 5.
Figure 7:
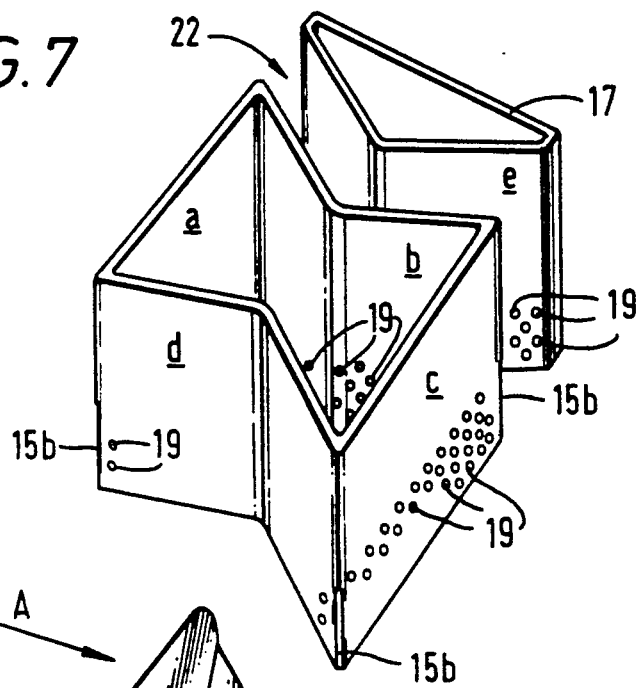
FIG. 7 is a perspective view, with a top plate removed, of a central and one side portion of the heating head shown in FIG. 5.
Figure 8:
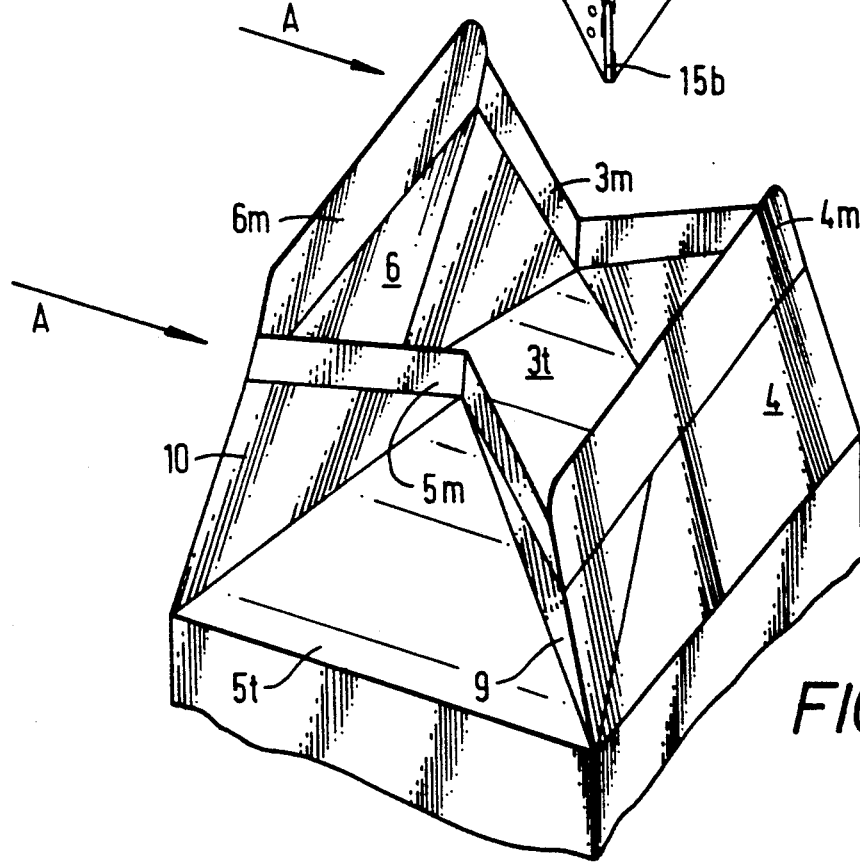
FIG. 8 is a perspective view of a carton top in a partly closed state ready for insertion into gaps between walls of the oven shown in FIG. 7.

A description will now be given of a conventional heating and sealing technique which is carried out downstream of a filling station (not shown) at which the cartons have been filled with a liquid. The heating step takes place at a heating station at which the top part of the partially closed carton (FIG. 8) is introduced into gaps (21, 22) between wall portions (15, 16, 17) of an "oven" (FIGS. 5 and 7). The wall portions have holes which enable streams of heated air to escape in order to heat corresponding zones of the marginal portions (4m–6m) of the carton so as to activate the adhesive (i.e. by melting the plastics coating). After the heating step, the carton is transported to a sealing station (FIG. 20) where parallel jaws urge the heated marginal portions 4m, 6m towards each other. This causes marginal portions 3m, 5m to close inwardly, as folding Vs, and become sandwiched between the marginal portions 4m, 6m to form the ridge-shaped seal 7.

An underside partly sectioned view of the oven is shown in FIG. 5. It includes a central portion 15 spaced by gaps 21, 22 from side portions 16, 17. Portions 15, 16, 17 are bolted to a backing plate 18 having through holes 15a, 16a, 16b, 17a, 17b which admit heated pressurised air into the respective chambers (which are best seen in the perspective view of FIG. 7). FIG. 7 shows the central portion 15 and one of the side portions 17 (portion 16 being omitted for clarity). Each chamber is closed at its lower end by a blank plate (not shown). The perforate side walls of each chamber have different patterns of holes 19 for directing the streams of heated air onto the corresponding zones on the marginal portions 3m–6m of the carton. These hole patterns are described in more detail below with regard to the prior art and the preferred embodiment of the invention. The section line in FIG. 5 passes through portions 15–17 just above the holes 19 and hence these holes cannot be seen in FIG. 5. However, the central portion 15 has corner slots 15b which can be seen in FIG. 5.

FIG. 6 illustrates front elevations of each outwardly facing surface of the oven walls. The relative positions of these walls (in the oven) can be seen in FIGS. 5 and 7. The walls are marked a–f in FIGS. 5, 6 and 7. Walls b and e are spaced by gap 22, and walls d and f are spaced by gap 21. From the proximity of FIGS. 7 and 8, it can be seen that the marginal portions 3m–6m of the panels 3–6 of the partly closed carton are inserted into the oven so that marginal portions 3m, 5m enter respective gaps 22, 21.

The machinery for transporting the cartons to the heating station is of known construction. Such machinery positions each carton, in turn, under the oven which is then lowered into the carton thereby positioning the oven at a predetermined height. (Alternatively, the carton could be raised towards a stationary oven.) The heated air streams, escaping from holes 19, then heat (the shaded) zones of the marginal portions as shown in FIG. 9. It will be appreciated that FIG. 9 shows an unfolded sleeve, i.e. with a carton blank laid out flat, since this facilitates comparisons between the outside and inside surfaces of the marginal portions with the hole patterns of the respective oven walls. The upper part of FIG. 9 shows the outside surfaces, whereas the lower part shows the inside surfaces. The shading is schematic in that it represents zones directly heated by the air streams corresponding hole patterns whereas, in practice, depending on filling speeds and temperature air control, certain areas on the marginal portions which are not directly heated will be heated to a lesser extent by indirect heating.

(Whilst FIG. 9 illustrates a strip p at the side of panel 6, which is used when forming the sleeve 2, i.e. by a bond running adjacent a vertical corner, it is alternatively possible to have strip p adjacent panel 3.)

The hole pattern shown in FIG. 6 is typical of a known high speed oven.

Figure 10:
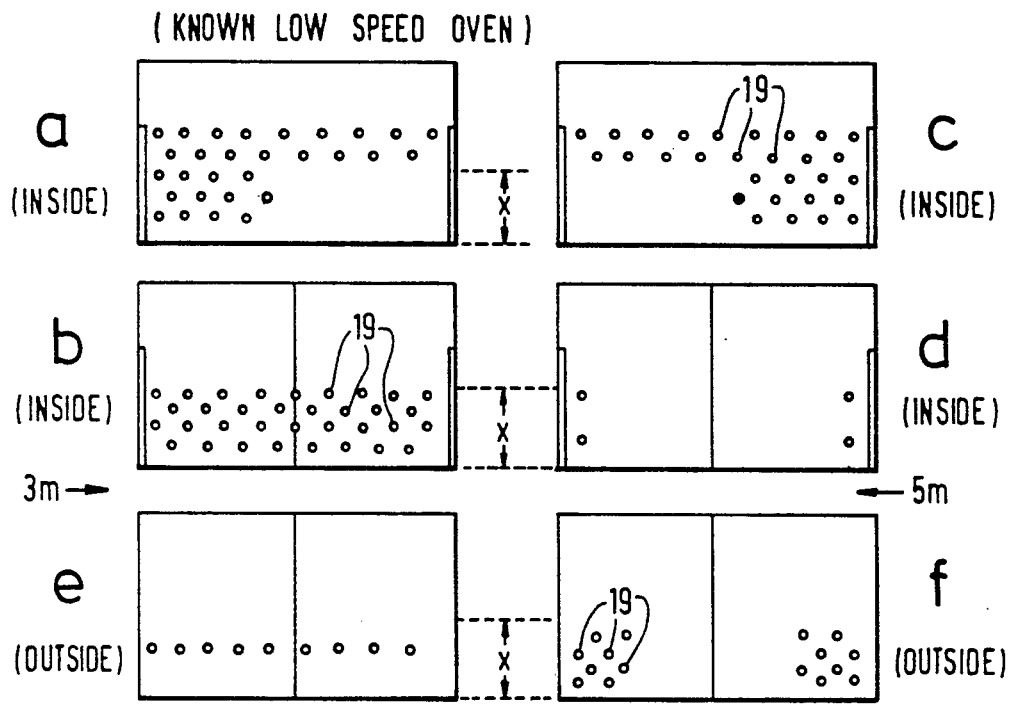
Figure 11:
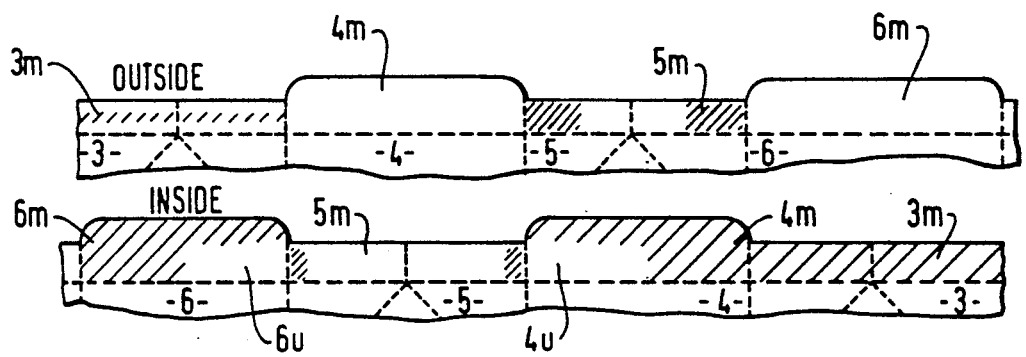
FIG. 11 shows corresponding heating zones on the marginal portions heated by the oven of FIG. 10, FIGS. 12(a–f) show elevational views of wall portion of a modified oven used for high speed filling, FIG. 13. shows corresponding heated zones on the marginal portions of a carton heated by the oven of FIG. 12, FIG. 14(a–f) show elevational views of wall portions of an oven in accordance with the preferred embodiment of the invention.

FIGS. 10 and 11 are similar views showing the hole pattern and the heating zone pattern for a known low speed oven. In FIGS. 10 and 11, it will be seen that unheated areas 4u, 6u, on the inside surfaces of the marginal portions 4m, 6m, which are not directly heated by the hot air streams, correspond with blanked off areas in oven walls a and c. These areas help to facilitate opening of the pouring spout 11 (FIG. 3) i.e. by weakening the respective area of the bond in the ridge-shaped seal 7. These unheated areas do not appear in FIGS. 6 and 7 because no similar attempt is made to facilitate opening of the pouring spout. In the case of the known high speed oven, the areas 4u, 6u are not left so as to avoid the risk of carton leakage due to the problems of operating at higher speed (as mentioned above). Therefore, in the prior art, the area 4u, 6u were not used with high speed ovens in order to facilitate opening of the carton.

In both the low and high speed ovens (of the prior art), a continuous expanse of oven wall is blank between the holes in the corners of the confronting walls d and f. This enables the pouring spout to be pulled out. However, this hole pattern leads to leakage in cartons, particularly when heat sealed at higher speed.

Figure 16:
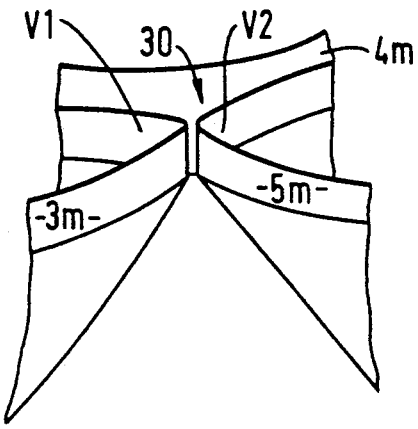
FIG. 16 is a perspective view of part of a carton top, which has been exaggerated, to illustrate a gap between V folds.

Referring to FIG. 16, this schematically illustrates one of the problems of obtaining an hermetic seal at a central region between the V-folds (V1, V2) in the marginal portions 3m, 5m of the bellows-shaped panels 3, 5. These V-folds meet at the centre of the ridge-shaped seal and leave a channel or gap 30 which is difficult to seal. A stake or dam can be provided in the ridge-shaped seal 7, at this central region in order to improve the seal. However, in view of the existence of gap 30, a stake or dam alone is not always sufficient to seal the carton in this central region and this problem is aggravated by increased filling speeds (for the reasons mentioned above).

Figure 17:
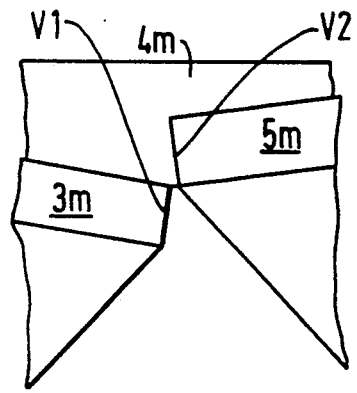
FIG. 17 shows part of a carton top to illustrate a misalignment problem.

Another problem which can be experienced at high filling speeds is the dipping of one V-fold (V1) with respect to the other V-fold (V2), as shown in FIG. 17. This can also result in carton leakage, since the gap 30 is enlarged, due to misalignment of the V-fold regions.

Further problems can be experienced due to chain stretch in the transport mechanism for moving cartons between the filling station and the heating and sealing stations. With regard to FIGS. 7 and 8, it will be appreciated that correct alignment of the carton top is important in order to provide consistent heating of the zones on the marginal portions corresponding with the hole patterns. When chain stretch occurs, misalignment can occur, and this has been found to adversely affect the quality of the ridge-shaped seal 7 when using prior art techniques, particularly at high belt speeds.

As mentioned above, due to the demand for higher filling speeds, cartons spend less time at the heating station. In accordance with prior art techniques, the amount of heat supplied by the oven has been increased, in order to heat the marginal portions of the carton in a shorter space of time. However, if the temperature of the air stream is increased too much, with existing hole patterns, this can damage the adhesive (and abhesive where used), leading to ineffective seals. Moreover, at high filling speeds, there is greater risk of splashing of the liquid contents on the inner surfaces of the marginal portions, which again adversely affects the adhesive bonds.

Figure 12:
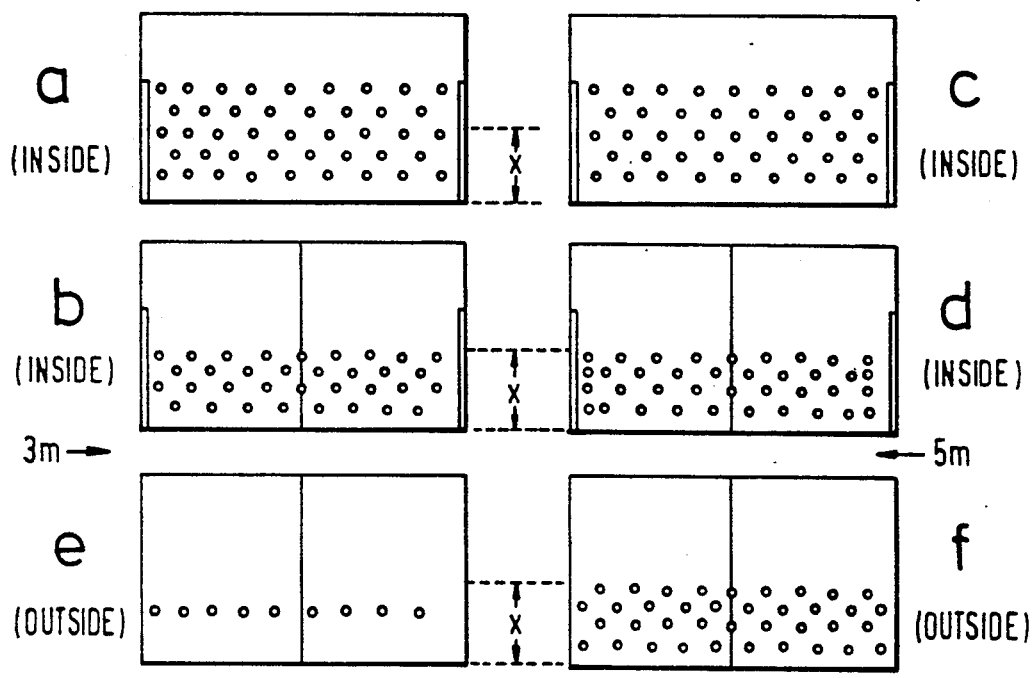
Figure 13:
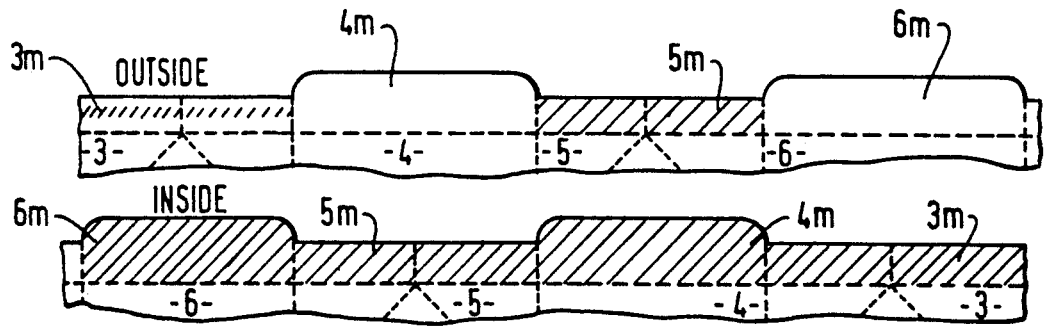

A prior art solution to these problems of leakage will now described with reference to FIGS. 12 and 13. FIGS. 12 and 13 show similar views to those of e.g. FIGS. 6, 9 and illustrate the hole patterns in the walls of an oven for high speed filling and the corresponding zones of heating on the marginal portions of a carton. As shown in FIG. 12, oven walls b and f have been perforated with holes extending across their entire width. This modification can assist by causing the hot air streams to blow away any liquid which has splashed onto the marginal portions of the carton, as well as improving the strength of the bond to eliminate leakage. However, as the strength of the bond has been increased at the expense of facilitating carton opening, cartons sealed by this technique cannot be easily opened.

Figure 14:
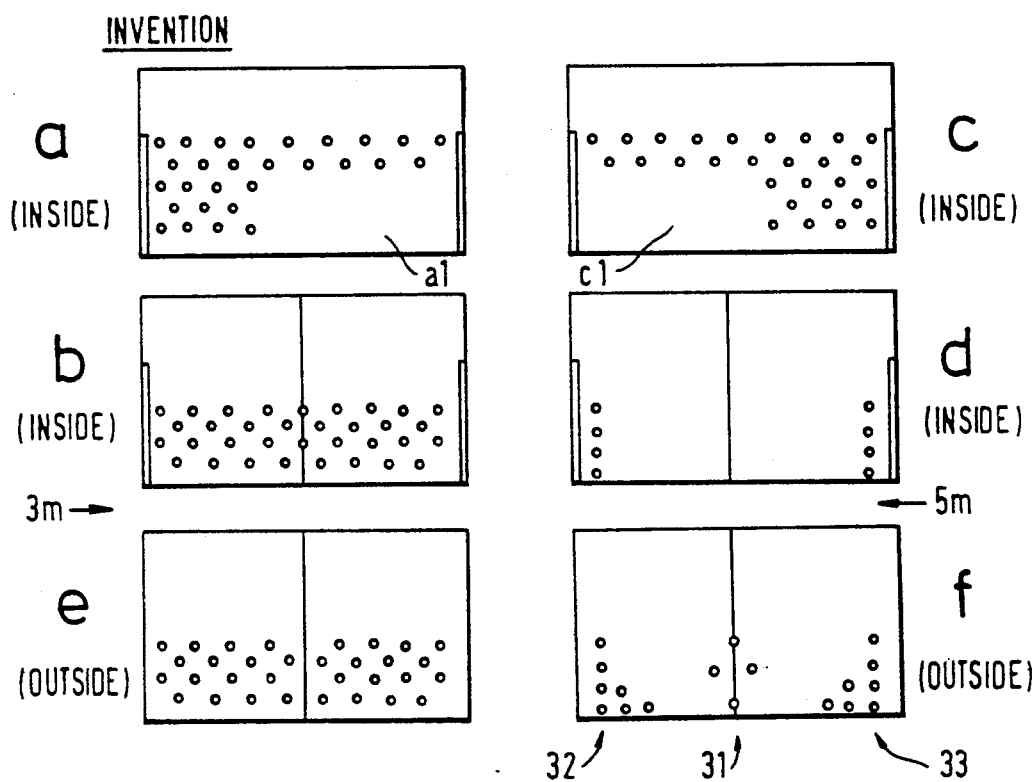
Figure 15:
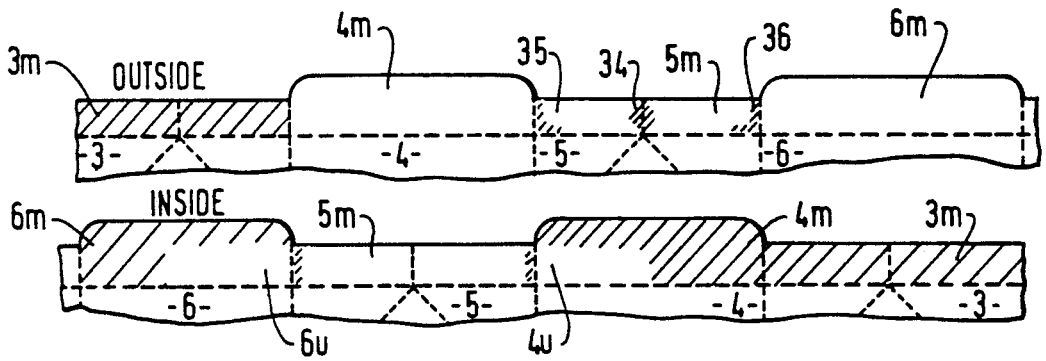
FIG. 15 shows corresponding heated zones on the marginal portions of a carton heated by the oven of FIG. 14.

The preferred embodiment of the invention, which is capable of dealing with higher filling speeds, will now be described with reference to FIGS. 14, 15 and 18. FIGS. 14 and 15 are similar views to those of e.g. FIGS. 6 and 9, and show the hole patterns in the oven walls and the corresponding zones of heating on the marginal portions 3m–6m of a carton. In particular, it will be noted from FIG. 14, that wall f has holes in a central corner region 31, as well as in end corner regions 32, 33. A corresponding central zone 34 and end zones 35, 36 of heating are shown on the marginal portion 5m of FIG. 15. It will also be noted that, despite operating at higher filling speeds, the walls a and c have blank regions a1, c1 which are similar to those in walls a and c of the known low speed oven. Wall d may have more holes (in the corners) than wall d of the known low speed oven (FIG. 10), but generally the holes are similar to those in the known high speed oven (FIG. 6). Wall e preferably has more holes than wall e of the known ovens, i.e. extending continuously across the wall, since this ensures a good bond between the outer surfaces of the folded marginal portion 3m (in the panel opposite the pouring spout panel) when the ridge-shaped seal is formed.

Figure 19:
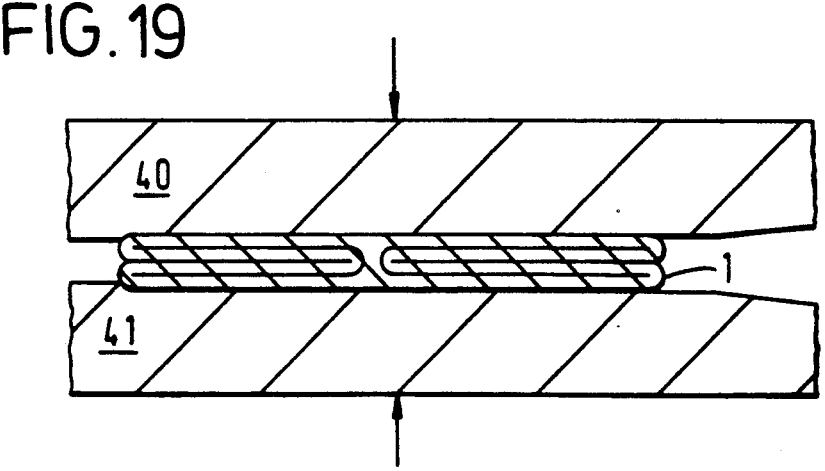
FIG. 19 is a plan view, in section, through sealing jaws closing on a ridge-shaped seal of a carton.
Figure 20:
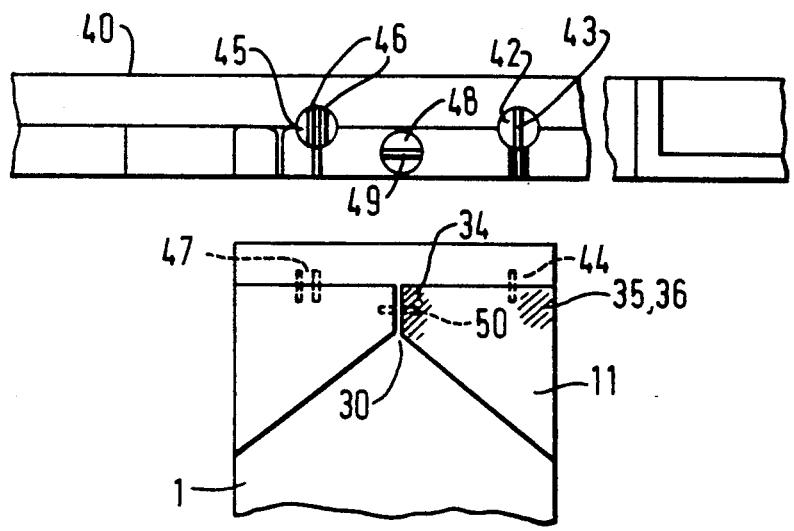
FIG. 20 shows a side elevation of one of the sealing jaws and a sectioned view of a sealed carton being removed from the jaws.

After the respective zones on the inside and outside surfaces of the marginal portions of the carton have been heated (as shown in FIG. 15), the carton is transported (by known means) to a sealing station where parallel jaws 40, 41, shown schematically in FIG. 19, press the marginal portions of the carton together to form the ridge-shaped seal 7. FIG. 19 is a cross section, in plan view, showing the way in which the marginal portions of the carton 1 are configured (in bellows fashion). It will be appreciated that FIG. 19 is a somewhat simplified view, since the jaws 40, 41 are specially shaped in order to assist in feeding and positioning each carton to perform the sealing step. The general construction and operation of jaws 40, 41 is known, however, to those skilled in the art. In the preferred embodiment of the invention, one of the jaws (40) is provided with double and single moveable dam pins to improve the hermetic seal. FIG. 20 is a side elevation of jaw 40 under which is shown a carton which has been sealed by jaws 40, 41. The heads of "moveable" dam pins can be seen in FIG. 19. Each pin is of cylindrical construction with a diameter of 5/16 inches. (Pins of a smaller diameter, e.g. 3/16 inches have been used in the past, but larger diameter pins are preferred to improve sealing). In particular, pin 42, which has a single raised ridge 43 to create vertical dam 44 on the carton, is of this enlarged diameter to compensate for the areas where the adhesive is not activated by heat, i.e. the areas between the heated zones on marginal portion 5m. Dam 44 is located immediately adjacent the inner boundary of the end corner bond 35, 36 (shown shaded). The bellows-folded panels are seen in the carton shown in FIG. 19, because the carton has been sectioned vertically so as to remove the sloping panel which would otherwise obscure this view. Pin 45 has a pair of parallel ridges 46 for making a double vertical dam 7 on carton 1. Pin 48 has a horizontal ridge 49 for making the horizontal dam 50 across the V-folds of the bellows panels to ensure a seal across the gap 30. The central corner bond 34 is shown shaded. A dam 50 extends across bond 34, and assists in making this bond. Moreover, if there is any chain stretch in the carton conveyor system (with the cartons moving from right to left of FIG. 20), this will not, within limits, prevent the dam 50 from nipping bond 34.

Figure 21:
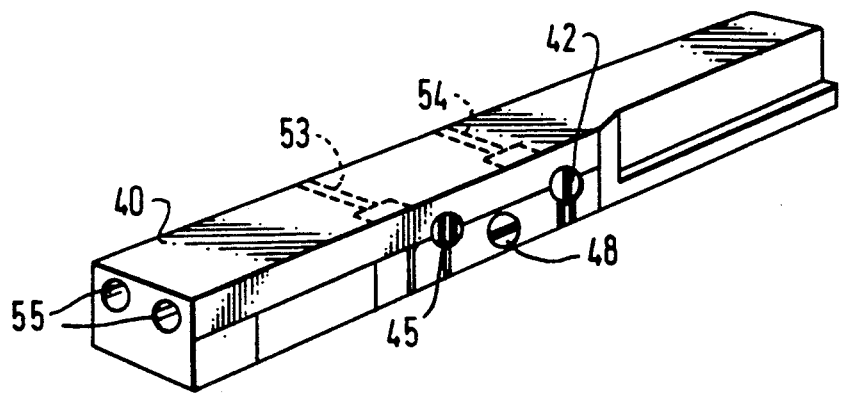

FIG. 21 is a perspective view of jaw 40 and shows threaded countersunk bores 53, 54 (in broken line). The wider bore portion receives the respective pin 42, 45 which is a press fit. A narrower bore portion receives a set screw (not shown) which can be screwed in and out to move the respective pins 42, 45 longitudinally in their bores. A similar counterbore (not shown) receives pin 48 and its adjusting set screw (not shown). Ports 55 are provided for cooling water connections.

Figure 18:
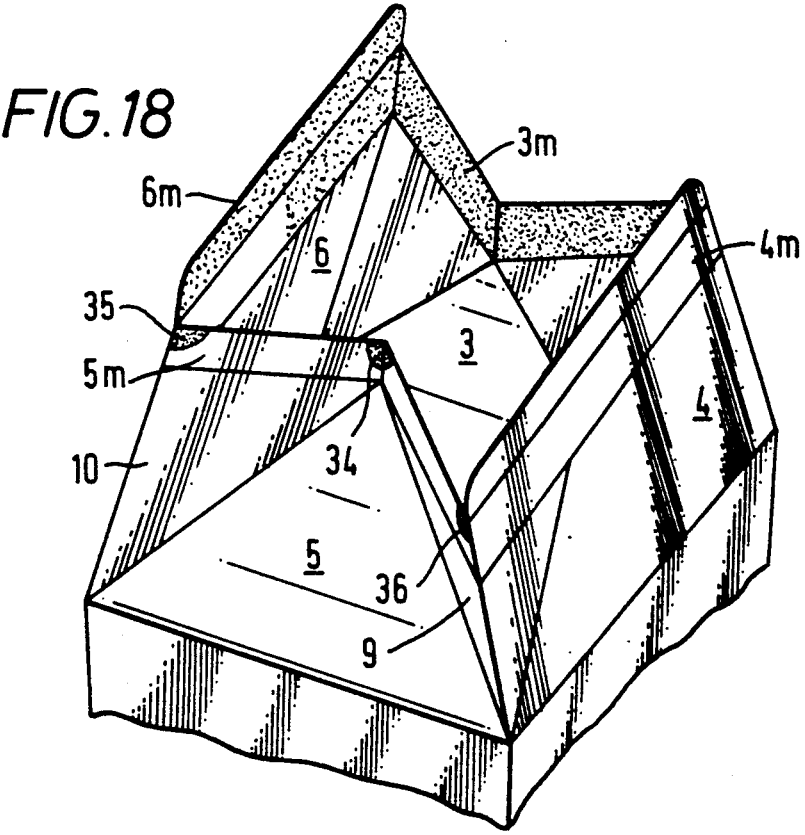
FIG. 18 shows a partly opened carton top with heated zones in accordance with the preferred embodiment of the invention.

FIG. 18 further illustrates where bonds are to be formed between outer confronting surfaces of the central corner 34 (in the V-fold in the marginal portion 5m), and between outer surfaces of opposite end corner regions 35, 36. These corners are formed when marginal portions 4m, 6m are pressed together by jaws at the sealing station. Areas 37, 38, between regions 34, 35, and 35, 36, are not directly heated by the oven, since they are positioned opposite blank regions between the hole clusters in wall f. Although a firmer bond is made at the central corner 34, this is on the outside surface of marginal portion 5m. Hence, this bond, and the bond between corners 35, 36, can be easily broken by the leverage applied when folding back the triangular wings (9, 10) when the carton is opened. Moreover, if the wings 9 and 10 are bowed slightly rearwardly (i.e. in a direction opposite to that of the pouring spout), when pushed back, this tends to exert a compressive force along the "inner" parts of marginal portions 4m and 6m to which each half of the marginal portion 5m is bonded, whereas marginal portion 5m tends to extend.

Since the areas between the heated zones 34, 35 and 34, 36 are not directly heated, these areas do not resist this extension, and the pouring panel tends to "pop-out" as the wings are pushed back. This is due to breakage of the bond in the central corner region 34, just prior to pushing the back the wings 9 and 10 to positions where the relative forces in the marginal portion tend to have a "snap" effect that results in the pouring panel "popping out" from the centre of the seal. This "snap" action breaks the remaining light bond, across the upper edge of marginal portion 5m, which is formed when the confronting inner surfaces of marginal portions 4m, 6m (i.e. those parts which overlap portion 5m) are heat sealed together to form the ridge-shaped seal. The end user therefore has an immediate tactile and visible indication that the centre part of the seal has easily opened, whereby the pouring spout 11 can be pulled out without difficulty.

The combination of the central corner bond 34 (FIG. 18) with the areas 4u, 6u (FIG. 15) which are not directly heated therefore result in an easy-to-open hermetic seal. Such a seal is improved by a vertical dam adjacent the bond between the corners of the wings. The seal is further improved by a horizontal seal extending between the V-folds of the bellows panels.

The preferred method of heat sealing has also been found to have the following advantages:

1) It can be used with both low and high speed filling machines.

2) It does not require as much heat to be applied, in the heating stop, as in the previously described prior art solution.

3) The same air temperature can be used at both high and low filling speeds.

4) Abhesives are not required.

5) It is less critical to misalignment of the carton with the heating oven and/or sealing head, especially where larger diameter vertical dams are made in the ridge-shaped seal, one of which is preferably a double dam.

6) Cartons are still easy to open, even where some bonds are made in the areas between the corners 34, 35 and 34, 36, i.e. which areas are not directly heated by the air streams. Such bonds can be made due to heat radiated by the blank areas in the oven walls a and c (FIG. 14), when the oven is hot. Since areas of the oven walls are not perforate, the bonds made by radiated heat are not as strong as those made by the direct heating due to holes in the oven walls.

7) As there is no adhesive activation on the inside surface of the marginal portion of the pouring spout panel, this inside surface is damaged when the carton is opened. When this inside surface is damaged (as in the prior art) by breaking adhesive bonds, the liquid in the carton (e.g. milk) can soak into the paperboard and turn it (e.g.) yellow.

8) It does not require to be used with any special (e.g.) pasteurization process (c.f. WO-A-90/09926).

It will also be noted that the invention solves the problem of making an easy-to-open hermetic seal in quite a different manner to the technique disclosed in WO-A-9009926 where an unsealed area is left in the marginal portion at the top centre of the pouring spout panel and where this marginal portion has a sealed area extending across its entire width (which can be seen when the wings have been folded back to reveal the pouring spout panel).

As the invention is primarily concerned with the way in which the ridge-shaped seal 7 is formed at the top of the carton, no description has been given of the way in which the bottom of the sleeve 2 is folded and sealed together to form a closed carton bottom. However, as the carton bottom can be formed by conventional techniques, no further description is necessary. Moreover, as the invention applies to all types of cartons having fold-back wings and a pull-out pouring spout, variations in carton design will be understood by those skilled in the art and will require no further specific description.

The blank from which the carton is constructed can also be made from other materials than paperboard, or may be made from various composite materials which include paperboard. Moreover, instead of using, e.g. paperboard which is coated with plastics material on both of its major surfaces, it would be possible to coat marginal portions of the carton top with (e.g.) thermally activated resin, in order to achieve the same purpose.

These and various other changes will be apparent to those skilled in the art without departing from the scope of the invention as defined by the appended claims.

We claim:

1. In a method of heat sealing the top of a carton, which is of a kind made from a blank which can be formed into a sleeve having panels for respectively forming a closed carton bottom and an open carton top, the carton top including first and second opposite panels which terminate in respective first and second marginal portions, third and fourth opposite panels which terminate in respective second and third marginal portions, the third panel forming a pouring spout panel, the first and second marginal portions extending upwardly beyond upper edges of the third and fourth marginal portions, and at least said marginal portions being coated with a material which serves as a heat-activated adhesive;

the method including the steps of:
heating zones on the marginal portions to activate the adhesive;
folding the panels so that the first and second panels form outer walls and so that the third and fourth panels are folded inwardly, in bellows fashion, and tucked under the outer walls, and
urging the heated marginal portions together to form a ridge-shaped seal in which parts of the first and second marginal portions are bonded together above the upper edges of the third and fourth marginal portions,
the sealed carton being such that the pouring spout panel, can be revealed by folding back wing portions which can then be drawn forwardly to form a pouring spout,
the improvement wherein:
only end zones and a central zone of the outside surface of the marginal portion of the third panel are directly heated, the end zones being spaced from the central zone by areas which are not directly heated,
zones on the inside surfaces of the marginal portions of the first and second panels are directly heated, except for an area, on each such marginal portion, which is intended to face a respective part of the inside surface of the marginal portion of the third panel,
whereby when the heated marginal portions are urged together to form said ridge-shaped seal, the third panel is secured by (i) a bond at a centrally folded corner of its marginal portion, (ii) a bond between opposite outer corners of said wings, and
(iii) a bond across the parts of the first and second marginal portions which extend above upper edges of the third and fourth marginal portions in the ridge-shaped seal.

2. A method according to claim 1 wherein the outer surface of the fourth marginal portion is directly heated across a zone extending substantially across its entire width and length.

3. A method according to claim 1 wherein said heating is carried out by directing streams of heated air at said zones on the marginal portions of said panels.

4. A method according to claim 1 including the steps of partially closing said carton top prior to heating said zones, and introducing the partially closed carton top into spaces between V-shaped walls of a heating head, said wall having perforations therein which are disposed in a pattern to direct the streams of heated air at said zones.

5. A method according to claim 1 which further includes making a vertical dam, in said ridge, adjacent the bonded outer corners of said wings, said dam extending across upper edges of the folded third marginal portion.

6. A method according to claim 1 which further includes making a horizontal dam, in said ridge, across a gap between confronting folds in said third and fourth marginal portions, which horizontal dam assists in making the bond at the centrally folded corner of the marginal portion of the third panel.

7. A method according to claim 1 which further includes making a double vertical dam, in said ridge, which extends across upper edges of the folded third marginal portion.

8. A method according to claim 1 wherein said carton is made from paperboard which is coated, on each side, with a material which can be heat activated to form said adhesive.

9. In apparatus for heat sealing the top of a carton, which is of a kink made from a blank which can be formed into a sleeve having panels for respectively forming an open carton top and other panels for forming a closed carton bottom, the carton top including first and second opposite panels which terminate in respective first and second marginal portions, third and fourth opposite panels which terminate in respective third and fourth marginal portions, the third panel forming a pouring spout panel, the first and second marginal portions extending upwardly beyond upper edges of the third and fourth marginal portions, and at least said marginal portions being coated with a material which serves as a heat-activated adhesive;

the apparatus including a heating head for heating zones on the marginal portions to activate the adhesive, the heating head comprising a central portion located between two side portions, said central portion including a chamber bounded on opposite sides by concave V-shaped walls, each side portion including a chamber bounded on one side by a convex V-shaped wall, the V-shaped wall of each side portion being spaced from a respective side of the central portion having said concave V-shaped wall so as to define spaces into which a partly closed carton top can be introduced, said walls having perforations therein to enable the escape of heated air streams for heating said zones on said marginal portions;
means for folding the panels so that the first and second panels form sloping walls and so that the third and fourth panels are folded inwardly, in bellows fashion, and tucked under the sloping walls, and means for urging the heated marginal portions together to form a ridge-shaped seal in which parts of the first and second marginal portions are bonded together above the upper edges of the third and fourth marginal portions;

the sealed carton being such that the pouring spout panel can be revealed by folding back wing portions which can then be drawn forwardly to form a pouring spout;

the improvement wherein the perforations in the convex wall of one of said side portions are located in both a central zone and end zones which correspond with said central zone and the end zones which are heated on the marginal portion of the third panel;

whereby only said end zones and said central of the outside surface of the marginal portion of the third panel are directly heated; said end zones being spaced from said central zone by areas which are not directly heated, and whereby zones on the inside surfaces of the marginal portions of the first and second panels are directly heated, except for an area, on each such marginal portion, which is intended to face a respective part of the inside surface of the marginal portion of the third panel;

the ridge-shaped seal, formed by urging the heated marginal portions together, being such that the third panel is secured by (i) a bond at a centrally folded corner of its marginal portion (ii) a bond between opposite outer corners of said wings, and (iii) a bond across the parts of the first and second marginal portions which extend above upper edges of the third and fourth marginal portions in the ridge-shaped seal.

* * * * *